United States Patent
Sakakibara et al.

(10) Patent No.: US 11,846,247 B2
(45) Date of Patent: Dec. 19, 2023

(54) THROTTLE VALVE DEVICE

(71) Applicants: DENSO DAISHIN CORPORATION, Tokoname (JP); DENSO CORPORATION, Kariya (JP)

(72) Inventors: Akito Sakakibara, Tokoname (JP); Toru Shimizu, Tokoname (JP)

(73) Assignees: DENSO DAISHIN CORPORATION, Tokoname (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 17/836,345

(22) Filed: Jun. 9, 2022

(65) Prior Publication Data
US 2022/0397069 A1 Dec. 15, 2022

(30) Foreign Application Priority Data
Jun. 11, 2021 (JP) ................................. 2021-098218

(51) Int. Cl.
*F02D 9/10* (2006.01)
*F02D 11/10* (2006.01)
*F16K 31/04* (2006.01)
*F02D 9/02* (2006.01)

(52) U.S. Cl.
CPC ............ *F02D 9/1065* (2013.01); *F02D 11/10* (2013.01); *F16K 31/043* (2013.01); *F02D 2009/0269* (2013.01); *F02D 2009/0277* (2013.01)

(58) Field of Classification Search
CPC .................. F02D 9/1065; F02D 11/10; F02D 2009/0269; F02D 2009/0277; F16K 31/043
See application file for complete search history.

(56) References Cited

U.S. PATENT DOCUMENTS

| | | | | |
|---|---|---|---|---|
| 4,867,122 | A * | 9/1989 | Kono | B60K 31/08 180/197 |
| 11,346,291 | B2 * | 5/2022 | Ishihara | F02D 9/1065 |
| 2002/0029760 | A1 * | 3/2002 | Saito | F02D 11/10 123/399 |
| 2002/0171059 | A1 * | 11/2002 | Sakurai | F16K 31/043 251/305 |
| 2004/0173184 | A1 * | 9/2004 | Tanimura | F02D 11/107 123/399 |
| 2005/0126536 | A1 * | 6/2005 | Torii | F02D 11/10 123/399 |
| 2009/0078898 | A1 * | 3/2009 | Sasaki | F02D 41/0077 251/129.11 |

(Continued)

*Primary Examiner* — Phutthiwat Wongwian
*Assistant Examiner* — Susan E Scharpf
(74) *Attorney, Agent, or Firm* — Nixon & Vanderhye P.C.

(57) ABSTRACT

A throttle valve device includes a coil spring arranged in a body between a valve gear and a valve and having a spring end extending radially outward. A first guide covers an end of the coil spring and includes a first guide hook that contacts the spring end. A body hook in the body is capable of contacting a tip end part of the first guide hook. A valve gear hook in the valve gear is capable of contacting a base end part of the first guide hook. The first guide hook has a protrusion protruding toward the spring end between the tip end part and the base end part. The first guide hook is deformable by receiving the spring force at the protrusion as an effort while a fulcrum is at a contact between the first guide hook and the body hook or the valve gear hook.

11 Claims, 10 Drawing Sheets

(56) References Cited

U.S. PATENT DOCUMENTS

| | | | | |
|---|---|---|---|---|
| 2011/0056461 A1* | 3/2011 | Kondo | ................... | F02D 9/105 |
| | | | | 123/403 |
| 2011/0283970 A1* | 11/2011 | Shimada | ................ | F02D 11/10 |
| | | | | 123/337 |
| 2013/0284147 A1* | 10/2013 | Nicholas | ................... | F02D 9/02 |
| | | | | 267/155 |
| 2017/0284310 A1* | 10/2017 | Delplanque | ............. | F16K 1/221 |
| 2018/0238409 A1* | 8/2018 | Higuchi | ................... | F16F 1/06 |
| 2021/0054791 A1* | 2/2021 | Ishihara | ............... | F16K 31/041 |

* cited by examiner

THROTTLE VALVE DEVICE

CROSS REFERENCE TO RELATED APPLICATION

This application is based on and incorporates herein by reference Japanese Patent Application No. 2021-098218 filed on Jun. 11, 2021.

TECHNICAL FIELD

The present disclosure relates to a throttle valve device.

BACKGROUND

An electronic throttle device, for example, enables an automobile to run in a limp home mode in case some trouble occurs in an engine control unit that controls an operating state of an engine or in an electronic throttle.

SUMMARY

According to an embodiment of the present disclosure, a throttle valve device includes a body, a valve, a motor, and a coil spring. The body has a passage and a motor space. The valve is arranged in the passage of the body and rotatable together with a shaft to open and close the passage. The motor is held in the motor space of the body and rotates the shaft via a valve gear in response to an electric signal. The coil spring is arranged in the body between the valve gear and the valve and generates a spring force as an opposing force when rotation is transmitted from the motor to the shaft. The coil spring has first and second spring ends extending outward in a radial direction of the coil spring at opposite ends of the coil spring. The throttle valve device includes a first guide, a body hook, and a valve hear hook. The first guide covers one end surface of the coil spring and includes a first guide hook that contacts the first spring end. The body hook is provided in the body and capable of contacting a tip end part of the first guide hook by receiving the opposing force of the coil spring. The valve gear hook is provided in the valve gear and capable of contacting a base end part of the first guide hook to rotate the first guide hook around the shaft against the opposing force of the coil spring. The first guide hook has a protrusion protruding toward the first spring end at an intermediate position between the tip end part and the base end part. The first guide hook is deformable toward one of hooks: the body hook and the valve gear hook, by receiving the spring force of the coil spring at the protrusion as an effort while a fulcrum is at a contact between the first guide hook and another of the hooks.

BRIEF DESCRIPTION OF DRAWING

The details of one or more embodiments are set forth in the accompanying drawings and the description below. Other features and advantages will be apparent from the description and drawings, and from the claims.

DETAILED DESCRIPTION

Figure 1:
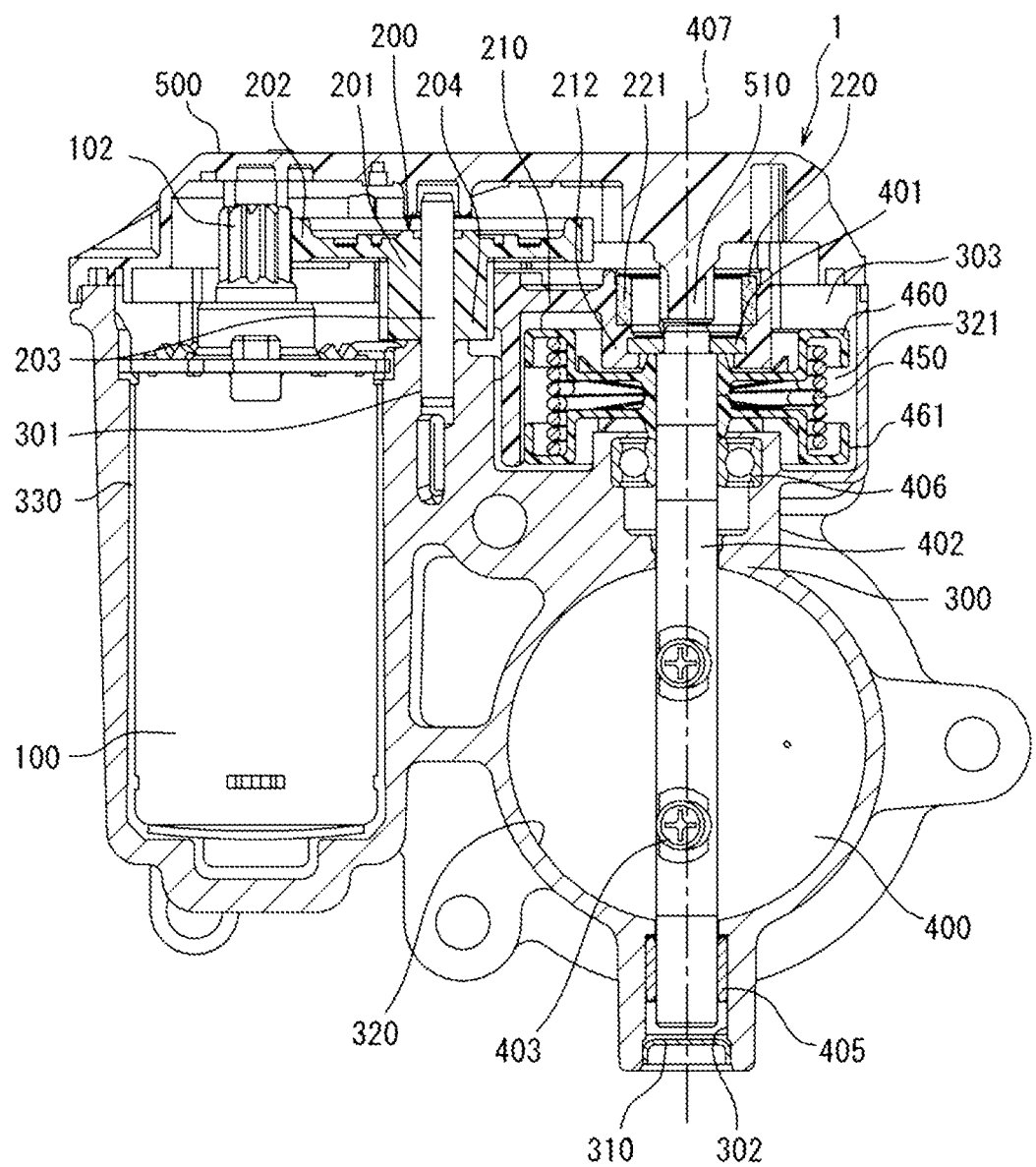
FIG. 1 is a vertical cross-sectional view of an electronic throttle device.

A throttle valve device in the present disclosure may be applicable, for example, in an electronic throttle device for controlling intake air of an engine, an EGR valve used in an exhaust gas circulation system, a pressure control valve of an intake passage for a diesel engine, and a negative pressure control valve for controlling a hydrogen concentration of a fuel cell.

More specifically, the throttle valve device holds a valve at a slightly opened position (hereinafter, this position is referred to as a "valve intermediate open position"), rather than at a position where the valve is fully closed by a coil spring that biases the valve.

An electronic throttle device according to a comparative example enables an automobile to run in a limp home mode in case some trouble occurs in an engine control unit that controls an operating state of an engine or in an electronic throttle. More specifically, when a motor of the electronic throttle device does not generate a driving force, a throttle valve is configured to stop at a valve intermediate open position, rather than at a position where an intake passage is fully closed.

In the electronic throttle device of the comparative example, a coil spring is used, and resin guides are arranged at opposite ends of the coil spring. In a range from the valve intermediate open position to a valve fully closed position, one of the resin guides contacts a body hook and functions as a stopper. In this case, the other of resin guides contacts a valve gear hook and rotates against an opposing force of the coil spring. In contrast, in a range from the valve intermediate open position to a valve fully open position, the other of the resin guides contacts a body hook and functions as a stopper. In this case, the one of resin guides contacts the valve gear hook and rotates against the opposing force of the coil spring.

In the electronic throttle device of the comparative example, it is premised on a fact that the one of the resin guides contacts both the body hook and the valve gear hook when the throttle valve is positioned at the valve intermediate open position. At the same time, it is premised on a fact that also the other of the resin guides contacts both the body hook and the valve gear hook when the throttle valve is positioned at the valve intermediate open position.

However, due to manufacturing variations, a width of the body hook and a width of the valve gear hook do not always match. Therefore, when the throttle valve is at the valve intermediate open position, it may happen that there is no contact between the one resin guide and the body hook, between the one resin guide and the valve gear hook, between the other resin guide and the body hook, or between the other resin guide and the valve gear hook.

If any of the resin guides does not contact the body hook or the valve gear hook, the valve intermediate open position will not be stable. Since the valve opening degree is not stable, there is a concern that running in a limp home mode may be hindered.

In contrast, according to the present disclosure, both resin guides can be made into contact with a body hook and a valve gear hook as much as possible even when a width of the body hook and a width of the valve gear hook do not match.

According to a first aspect of the present disclosure, a throttle valve device includes a body, a valve, a motor, and a coil spring. The body has a passage and a motor space. The valve is arranged in the passage of the body and rotatable together with a shaft to open and close the passage. The motor is held in the motor space of the body and rotates the shaft via a valve gear in response to an electric signal. The coil spring is arranged in the body between the valve gear and the valve and generates a spring force as an opposing force when rotation is transmitted from the motor to the shaft. The coil spring has first and second spring ends extending outward in a radial direction of the coil spring at opposite ends of the coil spring.

According to the first aspect of the present disclosure, the throttle valve device includes a first guide, a body hook, and a valve hear hook. The first guide covers one end surface of the coil spring and includes a first guide hook that contacts the first spring end. The body hook is provided in the body and capable of contacting a tip end part of the first guide hook by receiving the opposing force of the coil spring. The valve gear hook is provided in the valve gear and capable of contacting a base end part of the first guide hook to rotate the first guide hook around the shaft against the opposing force of the coil spring.

The first guide hook has a protrusion protruding toward the first spring end at an intermediate position between the tip end part and the base end part. The first guide hook is deformable toward one of hooks: the body hook and the valve gear hook, by receiving the spring force of the coil spring at the protrusion as an effort while a fulcrum is at a contact between the first guide hook and another of the hooks.

As described above, in the first aspect of the present disclosure, the protrusion is provided at the intermediate position between the tip end part and the base end part of the first guide hook and protrudes toward the spring end. The first guide hook is deformable by the spring force of the coil spring toward the body hook or the valve gear hook. Therefore, even if an error occurs in width of the body hook or width of the valve gear hook, the error can be eliminated or reduced by the deformation of the first guide hook. This makes it possible to stabilize the position of the valve intermediate open position.

According to a second aspect of the present disclosure, the throttle valve device further includes a second guide covering another end surface of the coil spring and including a second guide hook that contacts the second spring end. Both ends of the coil spring can be held by the first guide and the second guide.

According to a third aspect of the present disclosure, the first guide includes a first circular portion that covers the one end surface of the coil spring, and the first guide hook extends outward in the radial direction from the first circular portion. The first circular portion and the first guide hook can reliably hold the one end surface of the coil spring.

According to a fourth aspect of the present disclosure, the first circular portion of the first guide has a through hole in the vicinity of the first guide hook, and the first spring end of the coil spring extends through the through hole. The position of the first spring end is stable, and the first guide hook becomes easy to bend.

According to a fifth aspect of the present disclosure, the first guide includes a surrounding wall covering a part of an outer periphery of the coil spring only in the vicinity of the first guide hook of the first circular portion. The surrounding wall can prevent the coil spring from falling off. Moreover, since the surrounding wall is formed only in the vicinity of the first guide hook, the weight can be reduced.

According to a sixth aspect of the present disclosure, a thickness of the first guide hook is thinner on the base end part than on the tip end part. By reducing the thickness, the first guide hook becomes easy to bend.

According to a seventh aspect of the present disclosure, the first guide hook consists of a contact wall that contacts the first spring end of the coil spring, and a lateral wall on one side of the contact wall. By using only the lateral wall on the one side of the contact wall, the first guide hook can be easily bent and the weight can be reduced.

According to an eighth aspect of the present disclosure, the second guide has the same shape as the first guide. Since the shapes are the same, there is no mistake in selecting the parts and thereby assembly becomes easy. Moreover, the design of the first guide and the second guide are standardized, and the design efficiency is improved.

According to a ninth aspect of the present disclosure, the coil spring is attached to the body in a state where: the one end surface of the coil spring is covered by the first guide while the first spring end is in contact with the first guide hook; and the other end surface of the coil spring is covered by the second guide while the second spring end is in contact with the second guide hook. Accordingly, assembling can be simplified.

An embodiment will be described below with reference to the drawings, in which a throttle valve device of the present disclosure is applied to an electronic throttle device. As described above, the throttle valve device of the present disclosure can be widely used as a throttle valve device such as an EGR valve, a pressure control valve for an intake passage of a diesel engine, and a negative pressure control valve for a fuel cell. Therefore, terms such as a "throttle shaft" and a "throttle valve" described below are just examples in use of the present disclosure in the electronic throttle device, but the uses of the shaft and the valve are not limited to the throttle.

FIG. 1 is a vertical cross-sectional view of the electronic throttle device. An outline of the electronic throttle device 1 will be described with reference to FIG. 1. The electronic throttle device 1 is arranged in an engine compartment and controls a flow rate of an intake air taken into an engine. An engine control unit (not shown) calculates an optimum intake amount in accordance with, for example, a driver's accelerator pedal operation and an engine rotation state, and outputs a rotation rate to a motor 100 according to the calculation results.

Figure 2:
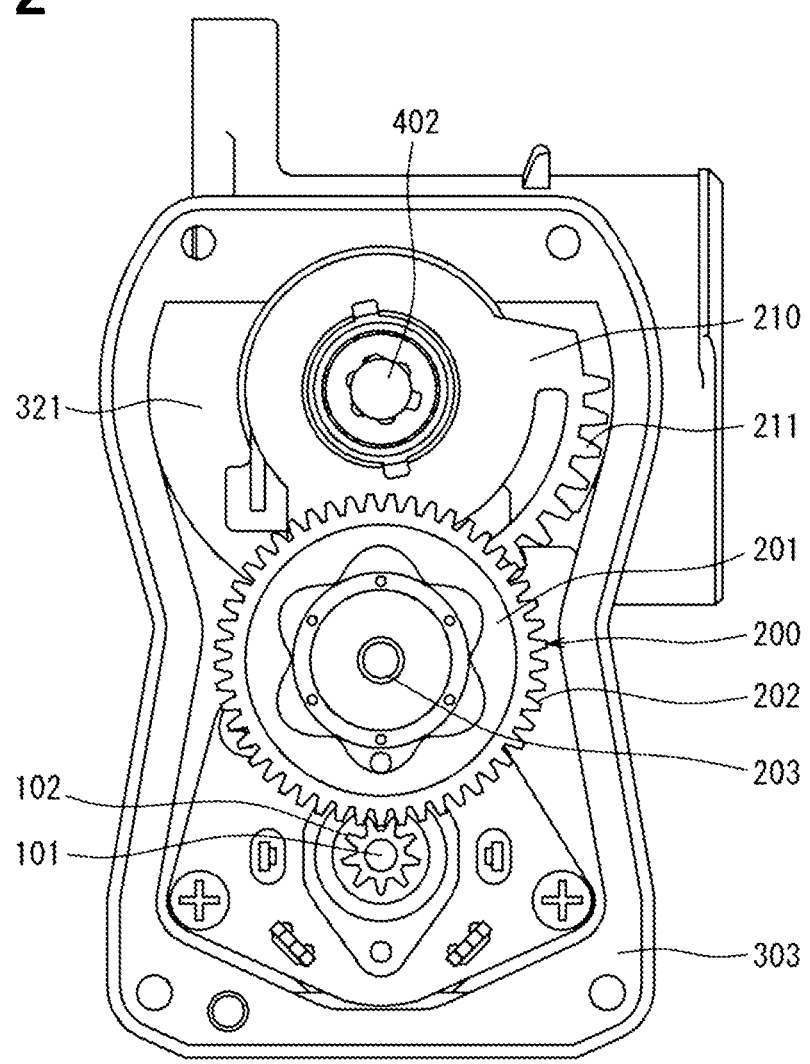
FIG. 2 is a front view of a body.

The motor 100 is arranged in a motor space 330 of a body 300 made of aluminum or an aluminum alloy. Rotation of the motor 100 is transmitted to a speed reduction mechanism 200 via a motor pinion 102 press-fitted and fixed to a motor shaft 101 (shown in FIG. 2). As shown in FIG. 2, the speed reduction mechanism 200 includes the motor pinion 102, an intermediate gear 201, and a valve gear 210.

A large-diameter gear 202 of the intermediate gear 201 meshes with the motor pinion 102. The intermediate gear 201 is held to be rotatable about an intermediate shaft 203. The intermediate shaft 203 is press-fitted and fixed into a fitting hole 301 of the body 300.

A small-diameter gear 204 of the intermediate gear 201 meshes with a teeth portion 211 that is formed in an arc shape on an outer circumferential surface of the valve gear 210. Rotation of the motor pinion 102 is transmitted to the valve gear 210 via the intermediate gear 201. The reduction rate of the speed reduction mechanism 200 is set, for example, such that the teeth portion 211 of the valve gear 210 advances clockwise or counterclockwise by one tooth per 28 rotations of the motor shaft 101.

Magnets 220 and 221 having semicircular arc shapes are arranged in an inner circumference of a cup center portion 212 of the valve gear 210, and the magnets 220 and 221 form a magnetic circuit. A lever 401 having a circular-plate shape is disposed in a deep portion (the lower side in FIG. 1) of the cup center portion 212 of the valve gear 210. The magnets 220 and 221 and the lever 401 are insert-molded with the valve gear 210.

The lever 401 is fixed to an end face of a throttle shaft 402 by swaging. Therefore, the valve gear 210 is connected to the throttle shaft 402 via the lever 401, and rotation of the valve gear 210 is transmitted to the throttle shaft 402. A throttle valve 400 having a circular-plate shape is fixed to the throttle shaft 402 by a screw 403. The throttle valve 400 increases or decreases an opening area of an intake passage 320 formed in the body 300 according to rotation of the throttle valve 400.

An open end 303 of the body 300 (the upper side in FIG. 1, the front side in FIG. 2) is covered by a cover 500. The cover 500 is formed of a resin such as polybutylene terephthalate (PBT), and ribs are provided at specified locations to increase its strength.

A pair of rotation angle sensors 510, which are Hall ICs, are disposed in the cover 500 at positions corresponding to an axis 407 of the throttle shaft 402. The rotation angle sensors 510 are fixed to the cover 500. The pair of arc-shaped magnets 220 and 221 which have been insert-molded on the valve gear 210 are arranged on an outer periphery of the rotation angle sensors 510. Since the magnets 220 and 221 rotate around the axis 407 according to the rotation of the throttle shaft 402, the magnetic circuit changes in position according to a rotation angle of the throttle valve 400. The rotation angle sensors 510 detect a change in magnetic force caused by the positional change of the magnetic circuit, thereby detecting an opening degree of the throttle valve 400. Then, the detected position information is fed back to an engine control unit (not shown).

The throttle shaft 402 is rotatably supported in the body 300 by bearings 405 and 406 disposed on both sides of the throttle valve 400. The bearing 405 is a plain bearing, and the bearing 406 is a ball bearing. An opening 302 of the body 300 is an opening for the bearing 405 to be inserted and is covered by a plug 310.

Figure 3:
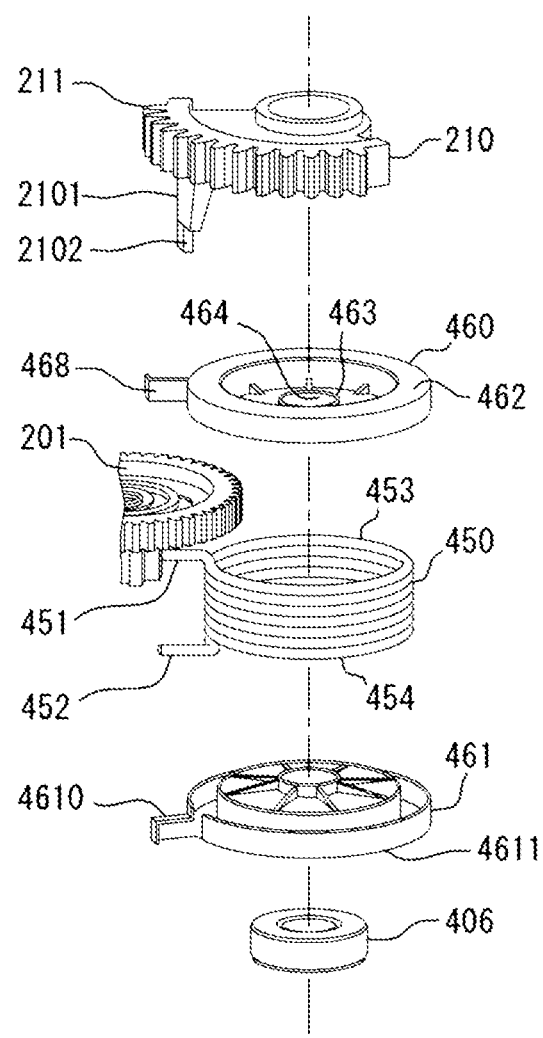
FIG. 3 is a perspective view showing a coil spring, a first guide, and a second guide.

The body 300 has a space 321 for housing the valve gear 210, and a coil spring 450 for urging the throttle shaft 402 is arranged in this space 321. The coil spring 450 is made of spring steel and has a cylindrical shape with a diameter of about 15 mm as shown in FIG. 3. A first spring end 451 (i.e. one spring end) and a second spring end 452 (i.e. the other spring end) are bent outward in a radial direction and protrude outward by about 5 mm.

One end surface 453 of the coil spring 450 is covered by a first guide 460. Another end surface 454 of the coil spring 450 is covered by a second guide 461. Both the first guide 460 and the second guide 461 are made of nylon 66 resin. Hereinafter, the first guide 460 will be described.

The first guide 460 includes a first circular portion 462 that covers the one end surface 453 of the cylindrical coil spring 450. Then, the one end surface 453 of the coil spring 450 is housed in the first circular portion 462. The first guide 460 has a hub 463 provided in the center of the first circular portion 462, and the throttle shaft 402 is loosely fitted in a center hole 464 of the hub 463. In other words, the first guide 460 is disposed rotatably around the throttle shaft 402.

Figure 8:
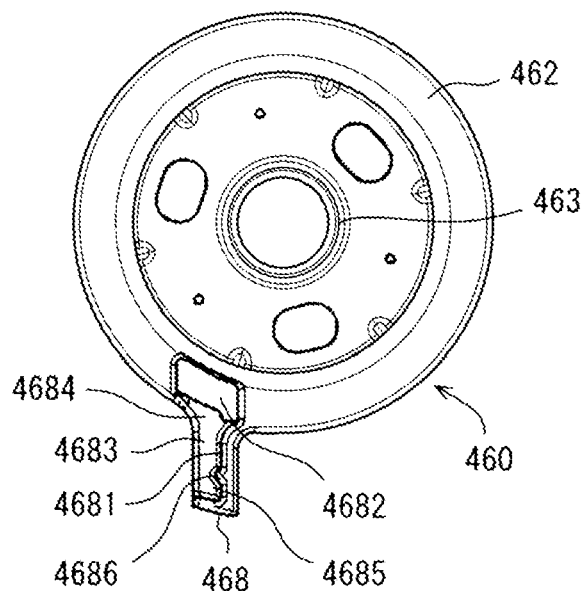
FIG. 8 is a front view of a first guide.
Figure 9:
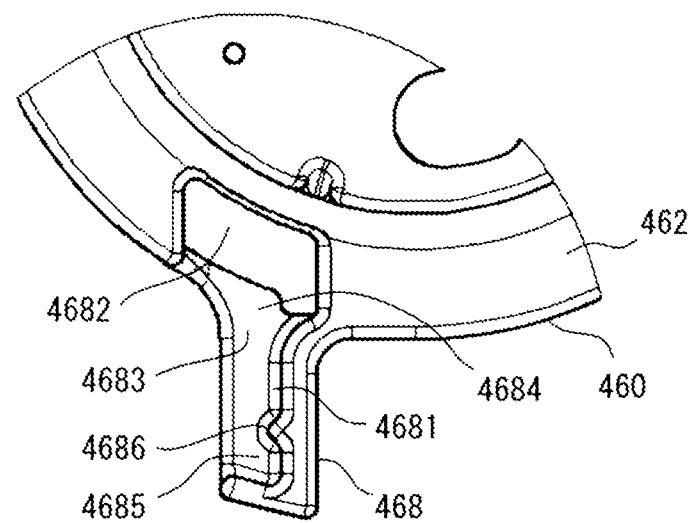
FIG. 9 is a partially enlarged view of the first guide shown in FIG. 8.

The first guide 460 has a first guide hook 468 that protrudes in the radial direction outward from the first circular portion 462. As shown in FIGS. 8 and 9, the first guide hook 468 includes a stopper surface 4681 that contacts the first spring end 451 to receive the spring force of the coil spring 450, a hole 4682 (through hole) through which the first spring end 451 extends, and a protector 4683 that covers a lateral surface of the first spring end 451. The hole 4682 improves an assembling process of the coil spring 450, and the protector 4683 prevents the coil spring 450 from falling off. Thus, the spring force of the first spring end 451 is surely transmitted to the stopper surface 4681 by the hole 4682 and the protector 4683.

The above-description is regarding the first guide 460. The second guide 461 has the same shape as the first guide 460, and thus the description of the first guide 460 can be applied to the second guide 461. The first guide 460 has been described based on FIGS. 8 and 9, but the second guide 461 shown in FIG. 1 has the same shape.

Since the first guide 460 and the second guide 461 have the same shape, it is not necessary to classify the first guide 460 and the second guide 461 at the time of assembling, and as a result, assembling time can be reduced. In addition, by having the same shape, the cost of an assembling equipment can be reduced and the cost of components can be reduced.

However, the second guide 461 is used in an inverted pose with respect to the first guide 460. Therefore, as shown in FIG. 3, the first circular portion 462 of the first guide 460 houses and holds the one end surface 453 of the coil spring 450, while a second circular portion 4611 of the second guide 461 houses and holds the other end surface 454 of the coil spring 450.

As shown in FIG. 1, the first guide 460, the coil spring 450, and the second guide 461 are arranged around the throttle shaft 402 on a back surface (the lower side in FIG. 1) of the valve gear 210. Then, the hub 463 of the first guide 460 is brought into contact with the metal lever 401, and a hub 463 of the second guide 461 is brought into contact with an inner race of the ball bearing (bearing 406).

As will be described later, the body 300 has a body hook 3050 that contacts the first guide hook 468 of the first guide 460 and a second guide hook 4610 of the second guide 461 to receive the spring force of the coil spring 450. Then, in a state where the first guide hook 468 and the second guide hook 4610 are in contact with the body hook 3050, the throttle valve 400 holds the intake passage 320 at a valve intermediate open position due to the urging force of the coil spring 450. Although this valve intermediate open position corresponds to a closed position, the throttle valve 400 does not fully close the intake passage 320 so as to allow running in a limp home mode in case of malfunction. That is, the intake passage 320 is slightly open so that a predetermined amount of intake air can flow in.

Next, an assembling process of the coil spring 450 will be described. Without a preload on the coil spring 450, the first guide 460 and the second guide 461 are separated away from each other by the coil spring 450. Even in this state, the first circular portion 462 of the first guide 460 accommodates the one end surface 453 of the coil spring 450, and the first guide hook 468 holds the first spring end 451. The second circular portion 4611 of the second guide 461 accommodates the other end surface 454 of the coil spring 450, and the second guide hook 4610 holds the second spring end 452.

From this state, a preload is applied to the coil spring 450. Accordingly, the first guide hook 468 of the first guide 460 comes into contact with a spring receiver of the valve gear 210, and the second guide hook 4610 of the second guide 461 comes into contact with a spring receiver of the body 300.

Therefore, in an assembled state, a contact of the first guide 460 and a contact by the second guide 461 are only a contact between the hub 463 of the first guide 460 and the metal lever 401 and a contact between the hub 463 of the second guide 461 and an inner race of the ball bearing (i.e. bearing 406). Therefore, a sliding resistance generated during rotation is drastically reduced.

Next, the opening and closing of the throttle valve 400 will be described together with the behavior of the coil spring 450. When the throttle valve 400 opens the intake passage 320 in order to increase the engine speed, the second spring end 452 of the coil spring 450 is kept at its position, and the first spring end 451 moves in accordance with the rotation of the throttle shaft 402. In response to this movement, the coil spring 450 applies a returning force to the throttle shaft 402, the valve gear 210, and eventually the motor 100.

On the other hand, when the throttle valve 400 closes the intake passage 320 to have the engine in the idling state, the throttle shaft 402 rotates from the valve intermediate open position to a fully closed position. In this case, the first spring end 451 of the coil spring 450 is kept at its position, and the second spring end 452 moves in accordance with the rotation of the throttle shaft 402, in contrast to the fully opening movement as described above.

Figure 4:
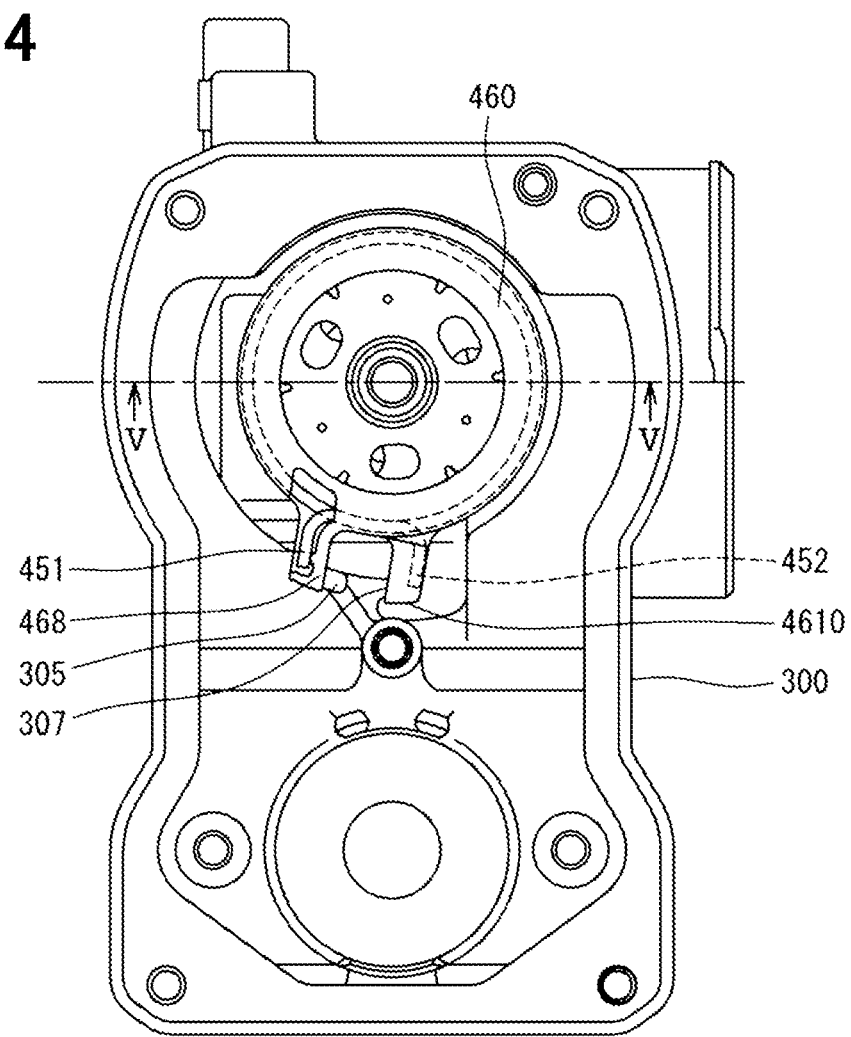
FIG. 4 is a front view in which an intermediate gear and a valve gear are omitted from FIG. 2.

Theses movements will be described with reference to FIGS. 4 to 7. FIG. 4 is a front view in which the intermediate gear 201 and the valve gear 210 are removed from FIG. 2, and shows the valve intermediate open position. The first guide hook 468 of the first guide 460 is in contact with a first body hook 305 formed on the body 300. At the same time, the second guide hook 4610 of the second guide 461 is in contact with a second body hook 307 formed on the body 300. In the present disclosure, the first body hook 305 and the second body hook 307 are collectively referred to as the body hook 3050. Both the first body hook 305 and the second body hook 307 are integrally formed on an outer surface of the body 300.

Figure 5:
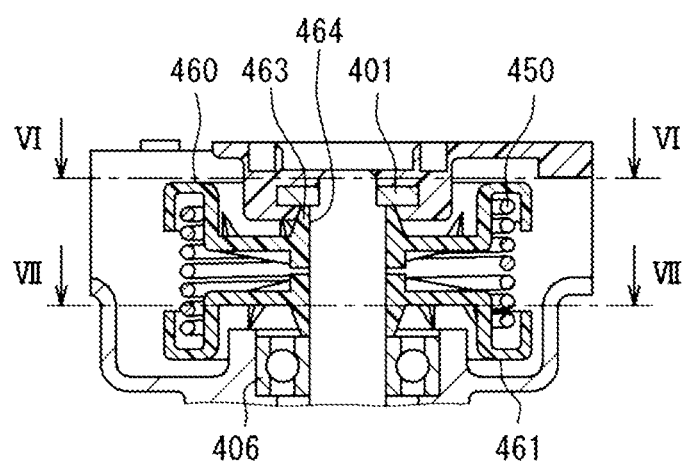
FIG. 5 is a cross-sectional view taken along a line V-V in FIG. 4.
Figure 6:
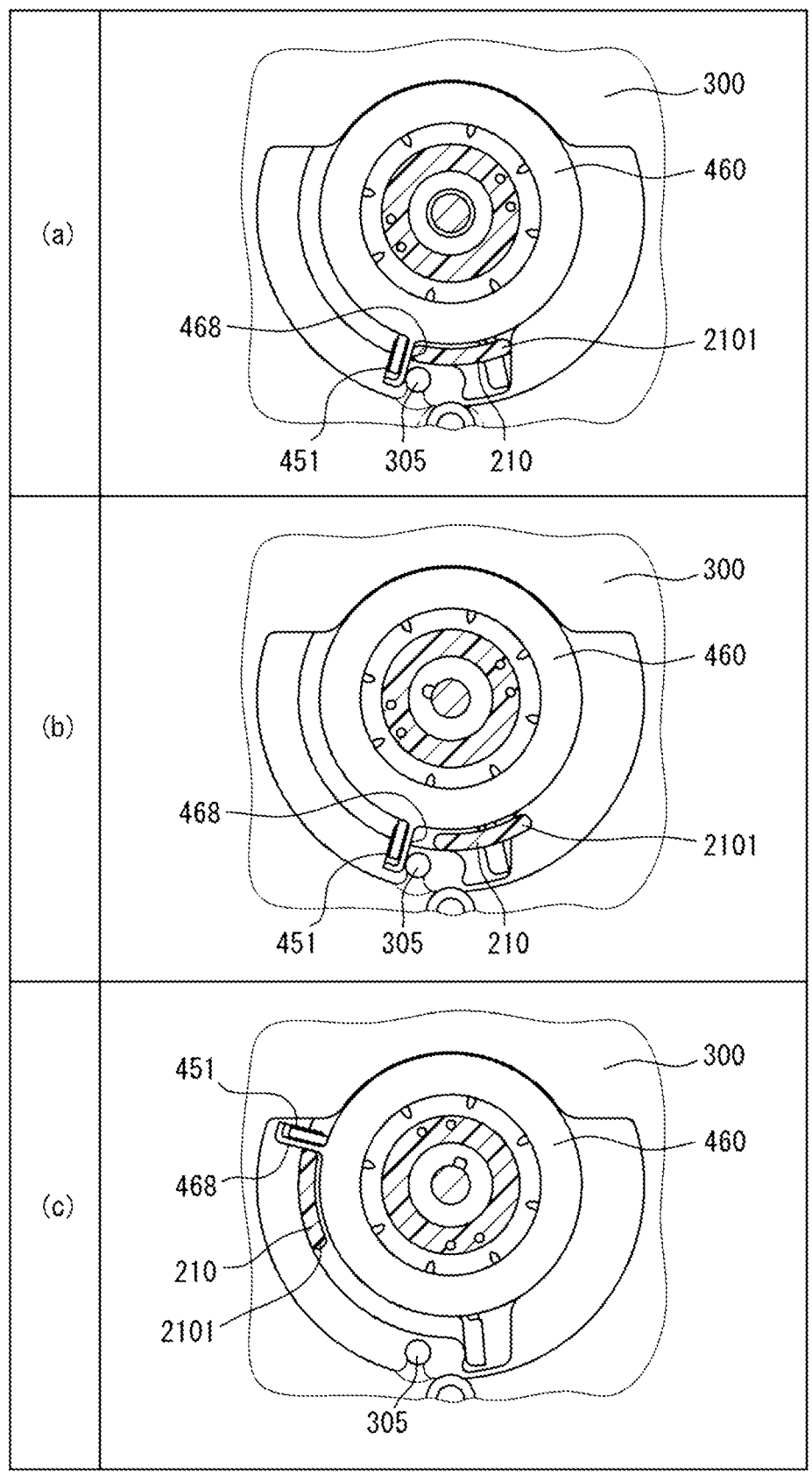
FIG. 6 is a cross-sectional view taken along a line VI-VI in FIG. 5.
Figure 7:
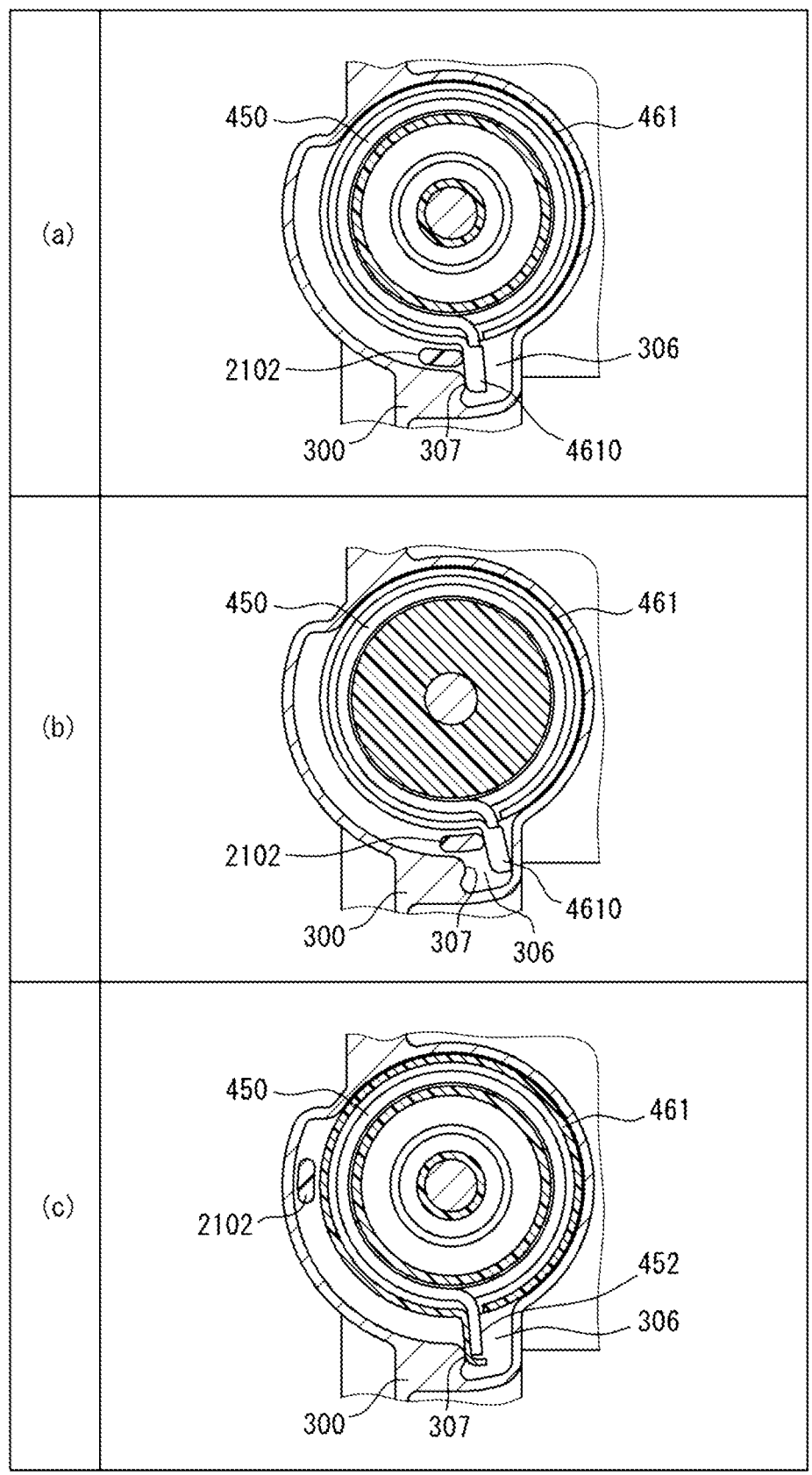
FIG. 7 is a cross-sectional view taken along a line VII-VII in FIG. 5.

FIG. 5 is a cross-sectional view taken along the line V-V of FIG. 4, and as shown in the figure, the first guide 460 and the second guide 461 are interposed between and held by the lever 401 and the bearing 406. FIGS. 6 and 7 are cross-sectional views taken along the VI-VI line and the VII-VII line of FIG. 5, respectively. FIGS. 6(a) and 7(a) show the valve intermediate open position, FIGS. 6(b) and 7(b) show the fully closed position, and FIGS. 6(c) and 7(c) show the fully open position.

As shown in FIG. 6, between the valve intermediate open position (position (a)) and the fully closed position (position (b)), the first guide hook 468 holding the first spring end 451 remains in contact with the first body hook 305 of the body 300. A first valve gear hook 2101 of the valve gear 210 simply separates from the first guide hook 468. In contrast, between the valve intermediate open position (position (a)) to the fully open position (position (c)), the first guide hook 468 is moved clockwise by the first valve gear hook 2101 of the valve gear 210.

Next, the movement of the second guide hook 4610 is shown in FIG. 7. Between the valve intermediate open position (position (a)) to the fully closed position (position (b)), the second guide hook 4610 holding the second spring end 452 moves counterclockwise in a movement groove 306 of the body 300 according to a rotation of a second valve gear hook 2102 of the valve gear 210. In contrast, between the valve intermediate open position (position (a)) to the fully open position (position (c)), the second guide hook 4610 does not move and remains in contact with the second body hook 307 which is one end of the movement groove 306 of the body 300.

As shown in FIG. 3, the first valve gear hook 2101 and the second valve gear hook 2102 are integrated and protrude from the valve gear 210. The first guide hook 468 contacts the first valve gear hook 2101, and the second guide hook 4610 contacts the second valve gear hook 2102. The first valve gear hook 2101 and the second valve gear hook 2102 are collectively referred to as a valve gear hook 2100.

As described above, at the valve intermediate open position, it is premised that both the first guide hook 468 and the second guide hook 4610 are in contact with the body hook 3050 and the valve gear hook 2100. Based on this premise, the rotation of the valve gear 210 from the valve intermediate open position due to the rotation of the motor 100 can cause the throttle valve 400 to open and close the intake passage 320 without delay.

However, the first valve gear hook 2101 and the second valve gear hook 2102 are provided at different portions of the valve gear hook 2100. Therefore, the position of the body hook 3050 and the position of the valve gear hook 2100 may deviate due to processing or assembly errors or component tolerances. If such a position deviation occurs, a non-contact portion may be generated between the first guide hook 468 and the first body hook 305, between the first guide hook 468 and the first valve gear hook 2101, between the second guide hook 4610 and the second body hook 307, or between the second guide hook 4610 and the second valve gear hook 2102.

Figure 15:
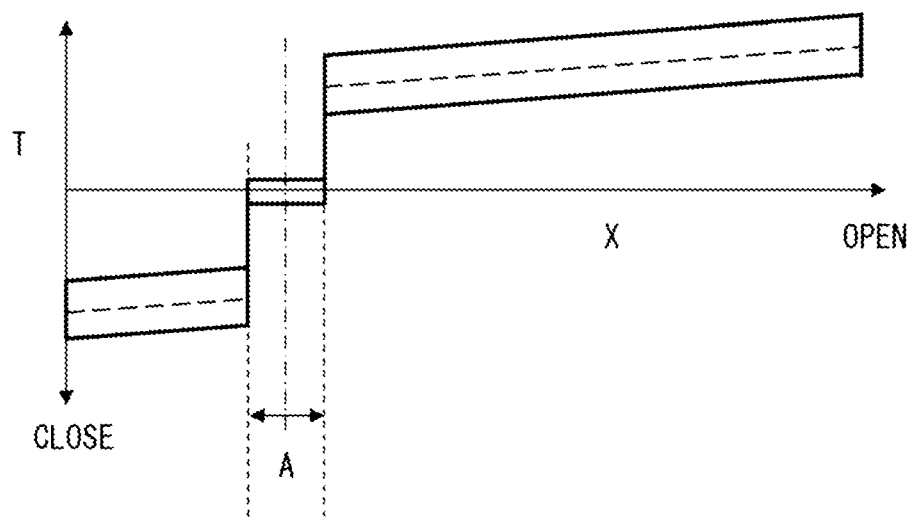
FIG. 15 is a diagram illustrating a hysteresis of spring force of the coil spring.

If such non-contact portion is generated, the spring force of the coil spring 450 will not be generated although the motor 100 is rotated to rotate the valve gear 210. As shown in FIG. 15, the valve intermediate open position is not fixed, and the valve intermediate open position is not stable. Therefore, an amount of intake air flowing from the throttle valve 400 also varies, and there is a concern that running in the limp home mode may be hindered. The horizontal axis of FIG. 15 indicates an opening degree X of the throttle valve 400. The vertical axis indicates a shaft torque T of the throttle shaft 402, and represents a magnitude of the spring force of the coil spring 450. The upper direction of the vertical axis shows the moving torque in the clockwise direction of FIG. 6, and the lower direction shows the moving torque in the counterclockwise direction of FIG. 7. The farther away from the center, the greater the torque.

Figure 10:
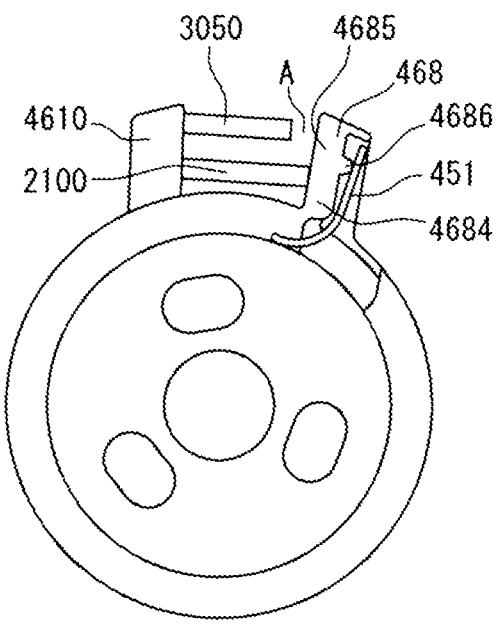
FIG. 10 is a front view showing the first guide, a valve hook, and a body hook.

For example, as shown in FIG. 10, it is assumed that the base end part 4684 of the first guide hook 468 is in contact with the valve gear hook 2100, but the tip end part 4685 is not in contact with the body hook 3050. Then, a gap A is generated in the non-contact portion. The size of this gap A may be about 0.2 mm due to accumulation of tolerances, and may become larger if a processing error is added to this. Since the spring force of the coil spring 450 does not work in the region of this gap A, the position of the throttle valve 400 is not stable.

In the present disclosure, in order to stabilize the valve intermediate open position, as shown in FIG. 9, a protrusion 4686 is formed at an intermediate position of the stopper surface 4681 of the first guide 460. The protrusion 4686 protrudes toward the first spring end 451, for example, by about 0.5 mm. Further, a thickness of the stopper surface 4681 is thinner on the base end part 4684 than on the tip end part 4685, so that the first guide hook 468 is easily deformed. As an example, the thickness of the base end part 4684 is about 1 to 1.5 mm, and the thickness of the tip end part 4685 is about 2 mm.

The intermediate position does not strictly refer to the center between the tip end part 4685 and the base end part 4684. The position may be between the body hook 3050 located on the tip end part 4685 and the valve gear hook 2100 located on the base end part 4684.

Figure 11:
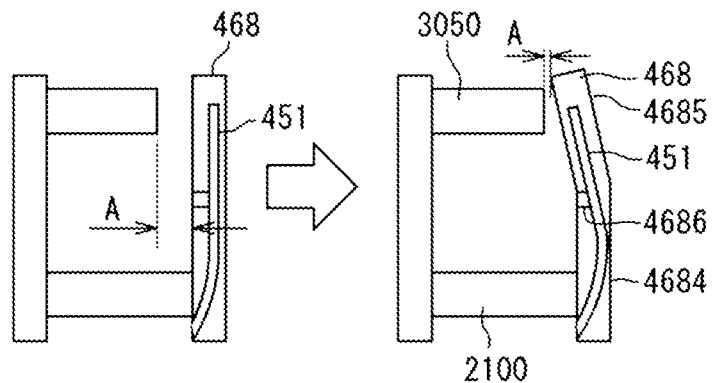
FIG. 11 is a diagram illustrating deformation of the first guide shown in FIG. 10.

In the example shown in FIG. 10, the spring force of the coil spring 450 acts in a direction of reducing the gap A of the non-contact portion. As shown in FIG. 11, the spring force at first spring end 451 acts on the first guide hook 468 at positions of the valve gear hook 2100 and the protrusion 4686. Accordingly, the spring force is applied to the first guide hook 468 such that a contact between the first guide hook 468 and the valve gear hook 2100 functions as a fulcrum, and a contact between the first guide hook 468 and the protrusion 4686 functions as an effort. As a result, the tip end part 4685 of the first guide hook 468 bends. Due to this bending, the gap A can be eliminated or the size of the gap A can be reduced at least.

Figure 12:
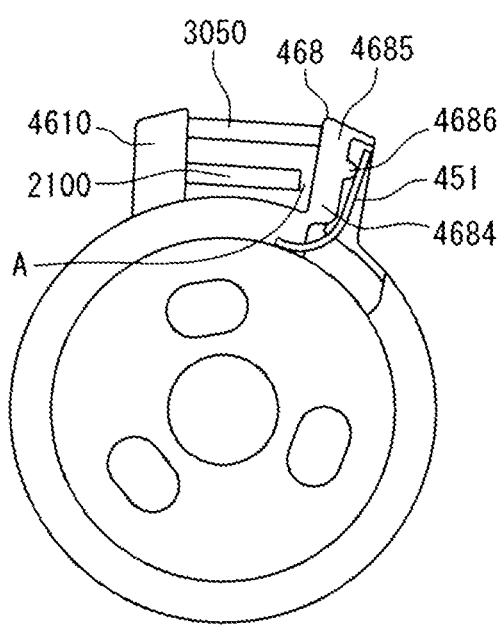
FIG. 12 is a front view showing the first guide, the valve hook, and the body hook.
Figure 13:
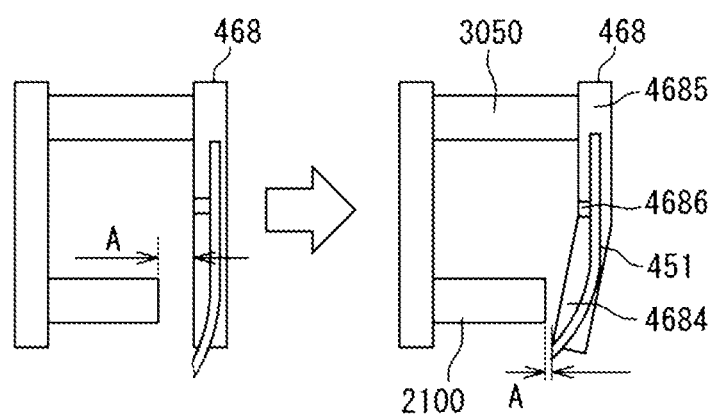
FIG. 13 is a diagram illustrating deformation of the first guide shown in FIG. 12.

The same applies to the case where, as shown in FIG. 12, the base end part 4684 of the first guide hook 468 is not in contact with the valve gear hook 2100, but the tip end part 4685 is in contact with the body hook 3050. Also in this case, the spring force of the coil spring 450 acts in the direction of reducing a gap A of a non-contact portion. As shown in FIG. 13, the spring force at first spring end 451 acts on the first guide hook 468 at positions of the body hook 3050 and the protrusion 4686. Accordingly, the spring force is applied to the first guide hook 468 such that a contact between the first guide hook 468 and the body hook 3050 functions as a fulcrum, and a contact between the first guide hook 468 and the protrusion 4686 functions as an effort. According to this spring force, the base end part 4684 of the first guide hook 468 bends. Due to this bending, the gap A can be eliminated or the size of the gap A can be reduced at least.

The above description has been given in the case where the non-contact portion is generated at the first guide hook 468, but the same applies to the second guide hook 4610. That is, even if a non-contact portion is generated at the second guide hook 4610 while the first guide hook 468 is in contact with both the valve gear hook 2100 and the body hook 3050, a gap A can be reduced by the above-mentioned spring force. Of course, the same applies to a case where a non-contact portion is generated at both the first guide hook 468 and the second guide hook 4610.

One of the reasons for generation of the non-contact portion is, as mentioned above, errors in processing and assembling and component tolerances. Therefore, even if the non-contact portion is generated, the gap A is not large. According to the present disclosure, the gap A caused by an error or a tolerance can be absorbed by bending of the first guide hook 468 or bending of the second guide hook 4610.

Figure 14:
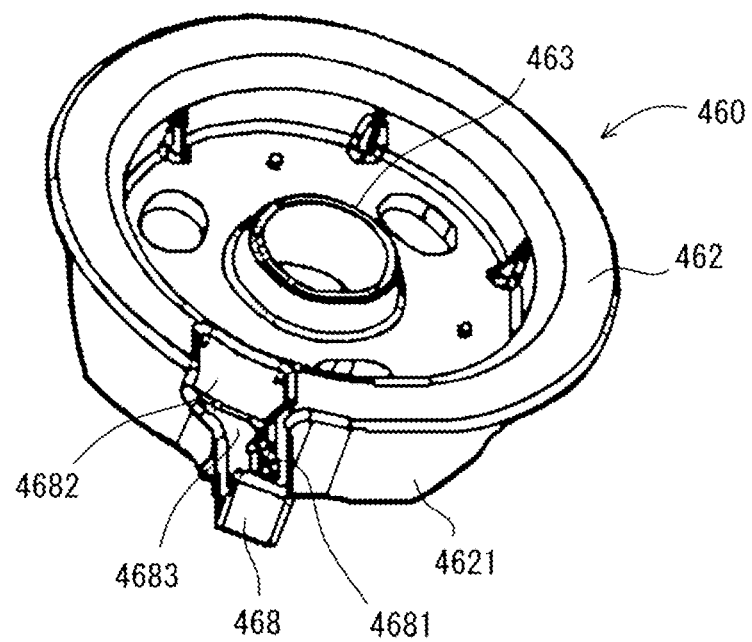
FIG. 14 is a perspective view of the first guide.

In the example of FIG. 3, a surrounding wall was formed on the entire circumference of the first circular portion 462 of the first guide 460, but the shapes of the first guide 460 and the second guide 461 are not limited to the shapes of FIG. 3. For example, as shown in FIG. 14, a surrounding wall 4621 may be formed only in the vicinity of the first guide hook 468 of the first circular portion 462. Accordingly, the area of the surrounding wall 4621 can be reduced and the weight can be reduced. Moreover, since the surrounding wall 4621 holds the coil spring 450 in the vicinity of the first guide hook 468, the holding of the coil spring 450 can be secured.

Further, in this embodiment, the second spring end 452 of the coil spring 450 close to the second guide 461 moves during the rotation from the valve intermediate opening position to the fully closed position, and the first spring end 451 close to the first guide 460 moves during the rotation from the valve intermediate opening position to the fully open position. However, the movement of the coil spring 450 may be reversed. Although the rotation of the motor 100 is also reversed, the operation is the same as this embodiment. In the present disclosure, the first guide hook 468 is not specified by its position.

Further, in the above example, the thickness of the stopper surface 4681 of the first guide hook 468 is thinner on the base end part 4684 than on the tip end part 4685. This has an advantage that the first guide hook 468 is easily deformed. However, it is also possible to make the thicknesses of them the same or to make the tip end part 4685 thinner than the base end part 4684 for manufacturing reasons.

Further, in the above example, the first guide 460 and the second guide 461 have the same shape, so that the assembly time can be shortened, the assembly equipment cost can be reduced, and the component cost can be reduced. However, if it is necessary to make the shapes of the first guide 460 and the second guide 461 different in relation to the shapes of the valve gear 210 and the body 300, the shape change must be allowed. If the protrusion 4686 can be formed only on either guide, the shape change of the first and second guides must be allowed. In the present disclosure, the guide hook having the protrusion 4686 is referred to as the first guide hook 468.

Further, when the second guide 461 is omitted and only the first guide 460 is used as necessary, the effect of reducing the gap A at the non-contact portion can be obtained. Also in this case, the guide covering either end surface of the coil spring 450 is the first guide 460.

Further, the above-described materials and dimensions of the components are also examples, and may be appropriately selected according to the requirements for the electronic throttle device 1.

As described above, the throttle valve device according to the present disclosure may be applicable in, for example, an electronic throttle device for controlling an amount of intake air of an engine, an EGR valve controlling a circulation amount of exhaust gas, a intake-passage pressure control valve controlling an intake air of a diesel engine, and a negative pressure control valve controlling a hydrogen concentration of a fuel cell.

The invention claimed is:
1. A throttle valve device comprising:
a body having a passage and a motor space;
a valve arranged in the passage of the body and rotatable together with a shaft to open and close the passage;

a motor held in the motor space of the body and configured to rotate the shaft via a valve gear in response to an electric signal;

a coil spring arranged in the body between the valve gear and the valve and configured to generate a spring force as an opposing force when rotation is transmitted from the motor to the shaft, the coil spring having first and second spring ends extending outward in a radial direction of the coil spring at opposite ends of the coil spring;

a first guide covering one end surface of the coil spring and including a first guide hook that contacts the first spring end;

a body hook provided in the body and capable of contacting a tip end part of the first guide hook by receiving the opposing force of the coil spring; and a valve gear hook provided in the valve gear and capable of contacting a base end part of the first guide hook to rotate the first guide hook around the shaft against the opposing force of the coil spring, wherein the first guide hook has a protrusion protruding toward the first spring end at an intermediate position between the tip end part and the base end part, and the first guide hook is deformed toward one of hooks: the body hook and the valve gear hook, by receiving the spring force of the coil spring at the protrusion as an effort during operation of the throttle valve device while a fulcrum is at a contact between the first guide hook and another of the hooks.

2. The throttle valve device according to claim 1, further comprising
a second guide covering another end surface of the coil spring and including a second guide hook that contacts the second spring end.

3. The throttle valve device according to claim 2, wherein the second guide has the same shape as the first guide.

4. The throttle valve device according to claim 1, wherein the first guide includes a first circular portion that covers the one end surface of the coil spring, and the first guide hook extends outward in the radial direction from the first circular portion.

5. The throttle valve device according to claim 4, wherein the first circular portion of the first guide has a through hole in the vicinity of the first guide hook, and
the first spring end of the coil spring extends through the through hole.

6. The throttle valve device according to claim 4, wherein the first guide includes a surrounding wall covering a part of an outer periphery of the coil spring only in the vicinity of the first guide hook of the first circular portion.

7. The throttle valve device according to claim 1, wherein a thickness of the first guide hook is thinner on the base end part than on the tip end part.

8. The throttle valve device according to claim 1, wherein the first guide hook consists of a contact wall that contacts the first spring end of the coil spring, and a lateral wall on one side of the contact wall.

9. The throttle valve device according to claim 2, wherein the coil spring is attached to the body in a state where:
the one end surface of the coil spring is covered by the first guide while the first spring end is in contact with the first guide hook; and
the other end surface of the coil spring is covered by the second guide while the second spring end is in contact with the second guide hook.

10. The throttle valve device according to claim 1, wherein the valve gear hook is longer than the body hook, the first guide hook is deformed toward the body hook, and the fulcrum is at the contact point between the first guide hook and the valve gear hook.

11. The throttle valve device according to claim 1, wherein the body hook is longer than the valve gear hook, the first guide hook is deformed toward the valve gear hook, and the fulcrum is at the contact point between the first guide hook and the body hook.

* * * * *